US006931002B1

(12) United States Patent
Simpkins et al.

(10) Patent No.: US 6,931,002 B1
(45) Date of Patent: Aug. 16, 2005

(54) HYBRID SWITCHING

(76) Inventors: Daniel S. Simpkins, Bethesda, MD (US); Steve Brass, Westboro, MA (US); Joseph E. Anstett, III, Gaithersburg, MD (US); Mark A. Turner, Ijamsville, MD (US)

(*) Notice: Subject to any disclaimer, the term of this patent is extended or adjusted under 35 U.S.C. 154(b) by 0 days.

(21) Appl. No.: 09/207,745

(22) Filed: Dec. 8, 1998

(51) Int. Cl.[7] .............................................. H04L 12/66
(52) U.S. Cl. ...................... 370/354; 370/374; 370/381
(58) Field of Search ............................... 370/229, 230, 370/351, 352, 353, 354, 355, 356, 357, 374, 370/375, 381, 379, 382, 383, 428, 429

(56) References Cited

U.S. PATENT DOCUMENTS

| | | | | |
|---|---|---|---|---|
| 3,732,548 A | * | 5/1973 | Howells et al. ........... | 340/172.5 |
| 3,796,835 A | * | 3/1974 | Closs et al. .................. | 370/355 |
| 4,575,844 A | * | 3/1986 | Kosuge et al. ............... | 370/354 |
| 4,731,785 A | * | 3/1988 | Ferenc et al. ................ | 370/537 |
| 4,893,306 A | * | 1/1990 | Chao et al. .................. | 370/539 |
| 4,941,141 A | * | 7/1990 | Hayano ....................... | 370/376 |
| 4,964,119 A | * | 10/1990 | Endo et al. .................. | 370/237 |
| 5,008,878 A | | 4/1991 | Ahmadi et al. | |
| 5,119,370 A | | 6/1992 | Terry | |
| 5,430,718 A | * | 7/1995 | Petersen ...................... | 370/378 |
| 5,978,370 A | * | 11/1999 | Shively ........................ | 370/370 |
| 5,995,510 A | * | 11/1999 | Sakurai et al. .............. | 370/396 |
| 6,119,215 A | * | 9/2000 | Key et al. ..................... | 712/19 |
| 6,215,788 B1 | * | 4/2001 | Sakurai et al. .............. | 370/395 |

FOREIGN PATENT DOCUMENTS

| | | |
|---|---|---|
| EP | 0 312 628 | 4/1989 |
| EP | 0 345 891 | 12/1989 |
| EP | 0 664 657 A2 | 7/1995 |
| GB | 2 291 562 A | 1/1996 |

OTHER PUBLICATIONS

Gard I. Et al: "Supporting STM Traffic with ATM- A Switching Implementation" Proceedings of the International Switching Symposium, De, Berlin, VDE Verlag, Apr. 23, 1995, vol. SYMP. 15, 1995, pp. 62-66.

Tarek N. Saadwi et al., "Fundamentals of Telecommunications Networks," pp. 399-349 (1994).

Matthew F. Slana, "Fundamentals of Digital Switching," chapter in "Time Division Networks" (John C. McDonald, ed.), pp. 150-168 (1983).

Myron J. Ross, "Circuit versus Packet Switching," chapter in "Time Division Networks" (John C. McDonald, ed.), pp. 198-219 (1983).

* cited by examiner

*Primary Examiner*—Dang Ton
*Assistant Examiner*—Phuc Tran
(74) *Attorney, Agent, or Firm*—Venable LLP; Michael A Sartori; Daniel G. Vivarelli, Jr.

(57) ABSTRACT

A switch switches time division multiplexed (TDM) data and packet data from input ports to output ports. The swich comprises: a plurality of input ports receiving data, wherein each data comprises either TDM data or packet data; a plurality of output ports transmitting switched data; and a shared memory coupling the input ports to the output ports. The shared memory sequentially receives the data from the input ports, and switches a sequentially received data from a respective input port to a respective output port. Switching of packet data by the shared memory has no latency or jitter effect on switching of TDM data by the shared memory.

29 Claims, 7 Drawing Sheets

(PRIOR ART)

HYBRID SWITCHING

BACKGROUND OF THE INVENTION

1. Field of the Invention

The invention relates to switching of both telephony data and packet data within a telecommunication switching system.

2. Discussion of the Prior Art

Time division multiplexed (TDM) switching and packet switching are alternative techniques for multiplexing many low-speed data channels into a single high-speed data channel for transport through a network. TDM data is passed to a telephone network, such as the public switch telephone network (PSTN), and packet data is passed to a packet network, such as the Internet. By multiplexing multiple low-speed data channels into a single high-speed data channel, benefits such as economic advantage and ease of management are realized. Traditionally, TDM networks and switching systems are segregated from packet networks and switching systems because each technique has different data types.

In TDM switching, a fixed partition of the available transport bandwidth is reserved when a connection to the switch is established. The partition takes the form of a "time slot," which is a segment of the data stream that occurs at regular intervals. During its assigned time slot, a data source may insert TDM data towards the remote end. If the source has no TDM data to send, the time slot is unused. Similarly, there is no mechanism for the data source to temporarily exceed the capacity provided by its assigned time slot. For TDM switching, data transfer characteristics for a given data channel, such as end-to-end delay and delay variation, are bounded and are independent of other channels carried over the same transport facility. Since the available data rate is constant, TDM is well-suited to data types such as uncompressed voice and video that present a constant bit stream to the network and require low, predictable transmission delays.

Figure 1:
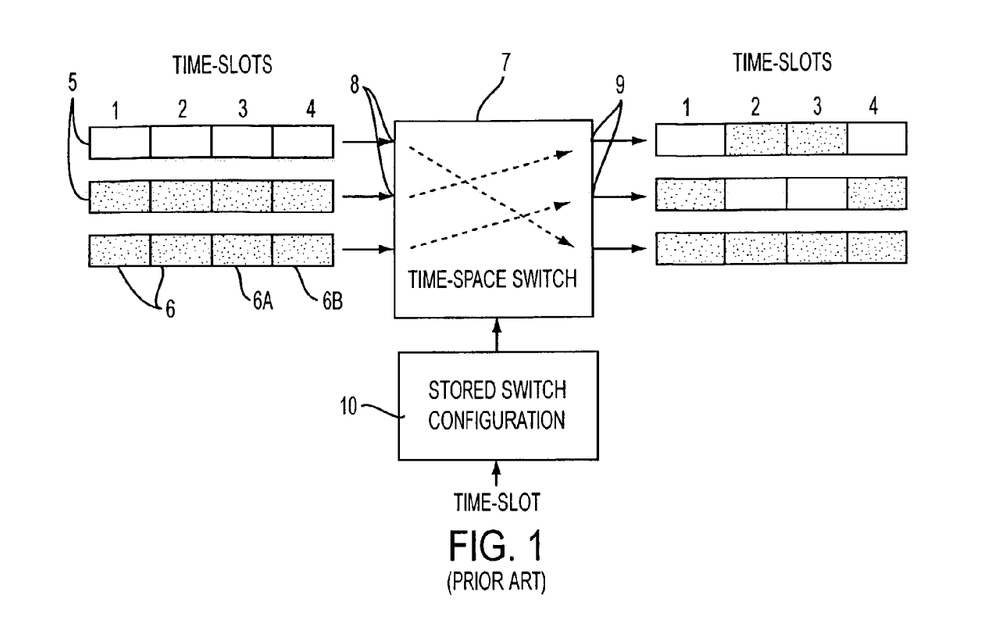
FIG. 1 illustrates a plan view of a traditional time-space architecture for switching TDM traffic.

FIG. 1 illustrates a plan view of a traditional time-space architecture for switching TDM traffic. The terms "time" and "space" refer to the dimensions which are manipulated in order to route each segment of TDM data to its desired destination. The "time" dimension corresponds to the time slots defined for each incoming and outgoing port. The "space" dimension corresponds to the incoming and outgoing physical ports of the switch. Traditional time-space architectures for switching TDM traffic is discussed in: Tarek N. Saadawi, Mostafa H. Ammar, and Ahmed El Hakeem, "Fundamentals of Telecommunication Networks," John Wiley & Sons, 1994; and Matthew F. Slana, "Time-Division Networks," chapter in "Fundamentals of Digital Switching" (John C. McDonald, ed.), Plenum Press, 1983.

In FIG. 1, incoming data at each input port is organized into frames 5, which are repetitive, fixed length sequences of time slots 6. During each frame, the time-space switch 7 passes data corresponding to each time slot 6 at an input port 8 to a specific time slot of an output port 9. The correspondence of input port 8 to output port 9 is specified by a stored switch configuration 10, which is generated at the time a connection (e.g., telephone call) is established and is static for the duration of the connection. Each TDM data unit arriving at the input of the switch 7 may have to be stored for a short time period while awaiting output from the switch at the proper time slot. The time period corresponds to the difference in time between the input time slot and the output time slot. The storage interval is constant and is less than one frame in duration.

In contrast to TDM switching, packet switching uses burst-type data, such as those associated with e-mail and file transfer applications. In a packet network, packet data sources compose data into units called packets for passage through the network. When a packet data source has a packet for transmission, it competes with other packet data sources for access to the transport facility. Since a packet data source without data to send consumes no network resources, packet switching is ultimately more efficient in terms of total data throughput. However, packet data sources requiring service (i.e., transmission of data) may be momentarily "blocked" by other packet data sources simultaneously requesting service. Therefore, the time required for a packet to traverse the network is not "deterministic" from the point of view of each packet data source. Furthermore, during periods of overuse, the network may "drop" data packets, and these data packets never reach their destination.

Figure 2:
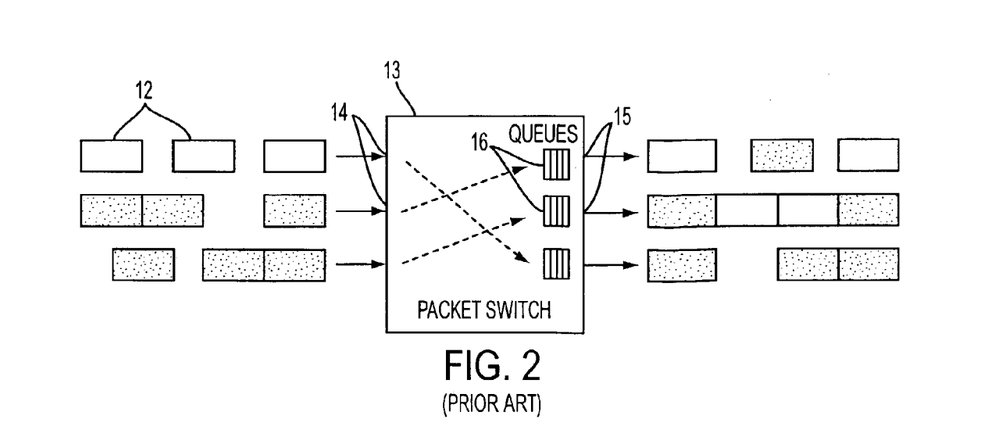
FIG. 2 illustrates a plan view of a traditional architecture for switching packet traffic.

FIG. 2 illustrates a plan view of a traditional architecture for switching packet traffic.

In contrast to the architecture shown in FIG. 1, packets 12 are not organized into frames, and the temporal position of each packet 12 with respect to other packets 12 is unimportant. The destination information for each packet is carried, either explicitly or implicitly, within the packet. Based on this information, the switch 13 routes the packet 12 from the input port 14 to one the output ports 15 of the switch 13. The information for routing the packets 12 is represented by the dashed lines in the switch 13. Unlike the switch 7, there is no guarantee that a collision will not occur at a given output 15 of the switch 13. Therefore, queues 16 are implemented at each output that can temporarily store traffic until the output becomes available. The queues 16 compensate for the variation in instantaneous demand for access to each output port 15. Traditional architectures for switching packet traffic is discussed in: Tarek N. Saadawi, Mostafa H. Ammar, and Ahmed El Hakeem, "Fundamentals of Telecommunication Networks," John Wiley & Sons, 1994; and Myron J. Ross, "Circuit versus Packet Switching," chapter in "Fundamentals of Digital Switching" (John C. McDonald, ed.), Plenum Press, 1983.

For a TDM switch, data corresponding to each incoming channel arrives at fixed, predictable intervals, and the input data rate always exactly matches the output data rate. For a packet switch, no specific time intervals are defined, so packets associated with each channel may arrive at any given interface at any time, and the input data rate in a packet switch may exceed the output data rate. These differing characteristics of TDM data and packet data imply the use of disparate architectures for switching, as has been done traditionally. However, it is possible to design a switching platform that is capable of handling a mix of TDM and packet-switched data. Such a platform is termed a "hybrid switch."

Hybrid switching techniques have been proposed and implemented in which TDM data is encapsulated into packets at the input of a hybrid switch. The TDM encapsulated packet is then routed to its destination output port using traditional packet-switching techniques. At the destination, the TDM data is extracted from the packet and is returned to TDM format. Traditional architectures for hybrid switching are discussed in: Myron J. Ross, "Circuit versus Packet Switching," chapter in "Fundamentals of Digital Switching" (John C. McDonald, ed.), Plenum Press, 1983.

Figure 3:
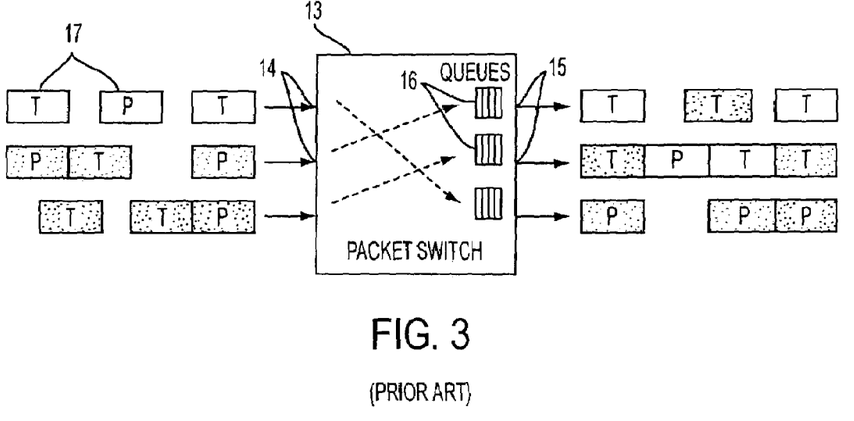
FIG. 3 illustrates a plan view of an architecture for a prior art hybrid switch.

FIG. 3 illustrates a plan view of an architecture for a prior art hybrid switch. The switch 13 of FIG. 3 operates in the same manner as the switch 13 in FIG. 2. The difference between FIGS. 2 and 3 is the type of packets that are sent to the switch 13. In FIG. 2, the packets 12 only contained packet data, and in FIG. 3, the packets 17 can contain either packet data, designated as "P", or TDM data, designation as "T". Prior to being sent to the switch 13, the TDM data is encapsulated as a packet, and after exiting the switch 13, the TDM data is de-encapsulated from the packet.

Prior art hybrid switches are advantageous in that a common packet switch core can be used to route both TDM data and packet data. However, the advantages of low, predictable delays offered by TDM switching may be lost because packets containing TDM data must compete with other packets in passing through the switch. Furthermore, the difficulty of converting the TDM data to and from packet data typically sacrifices the gains won by utilizing a common switching mechanism.

SUMMARY OF THE INVENTION

An object of the invention is to provide a hybrid switch for switching both TDM data and packet data, where the switching of packet data has no effect on the latency or jitter of the switching of TDM data.

An object of the invention is to provide a hybrid switch that has isochronous TDM data transfers and no TDM data delays at the output of the switch, even though the hybrid switch is also switching packet data.

An object of the invention is to provide a hybrid switch that has the same performance for switching TDM data as a standard time-space switch for switching TDM data, even though the hybrid switch is also switching packet data.

An object of the invention is to provide a hybrid switch that has no routing overhead for the TDM data, even though the hybrid switch is also switching packet data.

The invention includes a switch for switching TDM data and packet data between input ports and output ports. The switch comprises: a plurality of input ports receiving data, wherein each data comprises either TDM data or packet data; a plurality of output ports transmitting switched data; and a shared memory coupling the input ports to the output ports. The shared memory sequentially receives the data from the input ports, and switches a sequentially received data from a respective input port to a respective output port. Switching of packet data by the shared memory has no latency or jitter effect on switching of TDM data by the shared memory.

The invention includes a method for switching TDM data and packet data from input ports to output ports comprising the steps of: switching a TDM data from an input port to an output port, and switching a packet data from an input port to an output port. Switching a TDM data from an input port to an output port comprises: receiving a TDM data at the input port; determining the output port to route the TDM data; storing the TDM data in a preselected area of a shared memory; reading the TDM data from the preselected area of said shared memory; and transmitting the TDM data from the output port. Switching a packet data from an input port to an output port comprises: receiving a packet data at the input port; determining the output port to route the packet data; storing the packet data in said shared memory; reading the packet data from said shared memory; and transmitting the packet data from the output port. Switching packet data has no latency or jitter effect on switching TDM data.

Moreover, the above objects and advantages of the invention are illustrative, and not exhaustive, of those which can be achieved by the invention. Thus, these and other objects and advantages of the invention will be apparent from the description herein or can be learned from practicing the invention, both as embodied herein and as modified in view of any variations which may be apparent to those skilled in the art.

BRIEF DESCRIPTION OF THE DRAWINGS

Embodiments of the invention are explained in greater detail by way of the drawings, where the same reference numerals refer to the same features.

DESCRIPTION OF THE INVENTION

In the hybrid switch of the invention, TDM data and packet data are switched in a common switch. TDM data is passed through the switch in a deterministic manner as in a conventional TDM switch architecture. The passage of each TDM channel through the switch is unaffected by the bandwidth needs of other packet and TDM channels.

Figure 4:
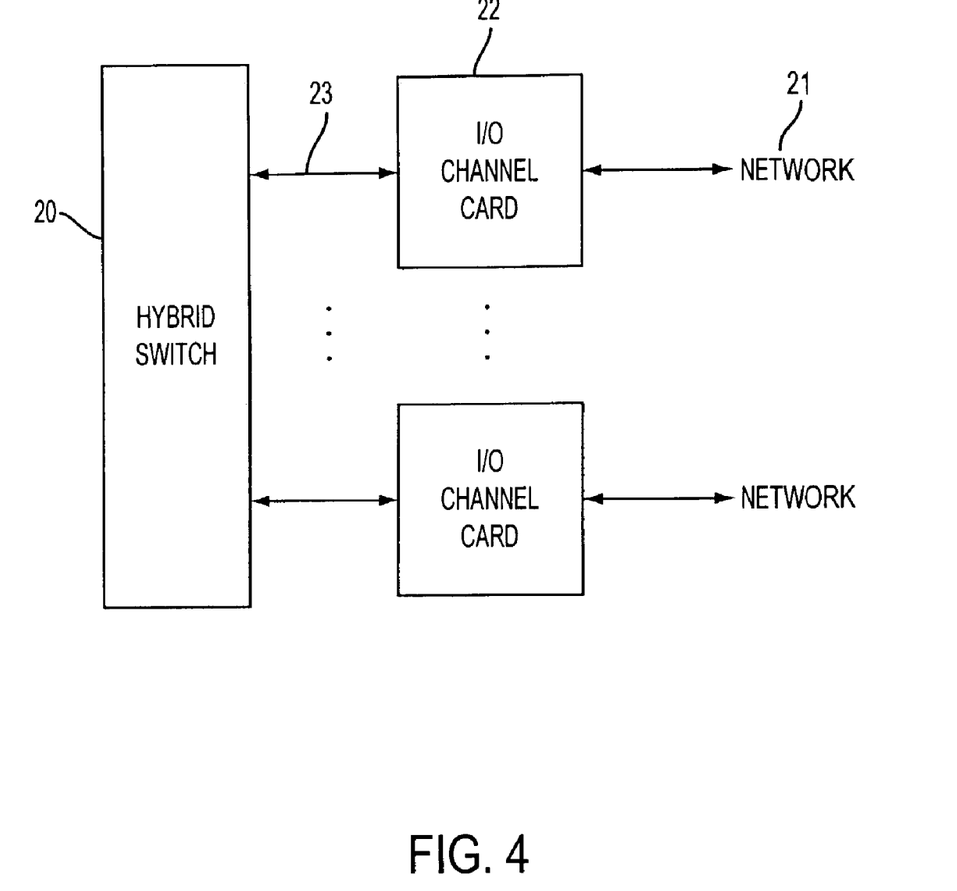
FIG. 4 illustrates a plan view of the hybrid switch of the invention.

FIG. 4 illustrates a plan view of the hybrid switch of the invention. A hybrid switch 20 is coupled to networks 21. The networks 21 can include both telephone networks, such as the PSTN, and packet networks, such as the Internet. Depending on the number of channels desired and on the channel density of input/output (I/O) channel cards available, one or more I/O channel cards 22 physically connect the hybrid switch 20 to networks 21. Each I/O channel card 22 performs pre-processing on incoming data from the corresponding network 21 and prepares data for input to the hybrid switch 20. Each I/O channel card 22 also performs post-processing on data arriving from the hybrid switch 20 before passing the data to the outbound transmission facility on the corresponding network 21.

In the hybrid switch of the invention, the framed time slot approach of FIG. 1 is used. The time slots within the input or output frames may be logically grouped in order to form a channel capacity greater than that provided by a single time slot. Since this channel is indivisible with respect to the switch, it is termed a "logical port." A channel carried by a single time slot is also considered to be a logical port. A single physical port can encapsulate many logical ports.

In contrast to the prior art switches, each logical port of the hybrid switch may be defined to carry either TDM data or packet data. The destination for TDM logical ports is determined by a stored switch configuration as described for the switch of FIG. 1. For logical ports carrying packets, the data may be independently routed, on a packet-by-packet basis, to any output logical port. The hybrid switch determines the destination logical port for each packet by examining both the input logical port, the routing information carried in the packet, and the stored switch configuration.

Figure 5:
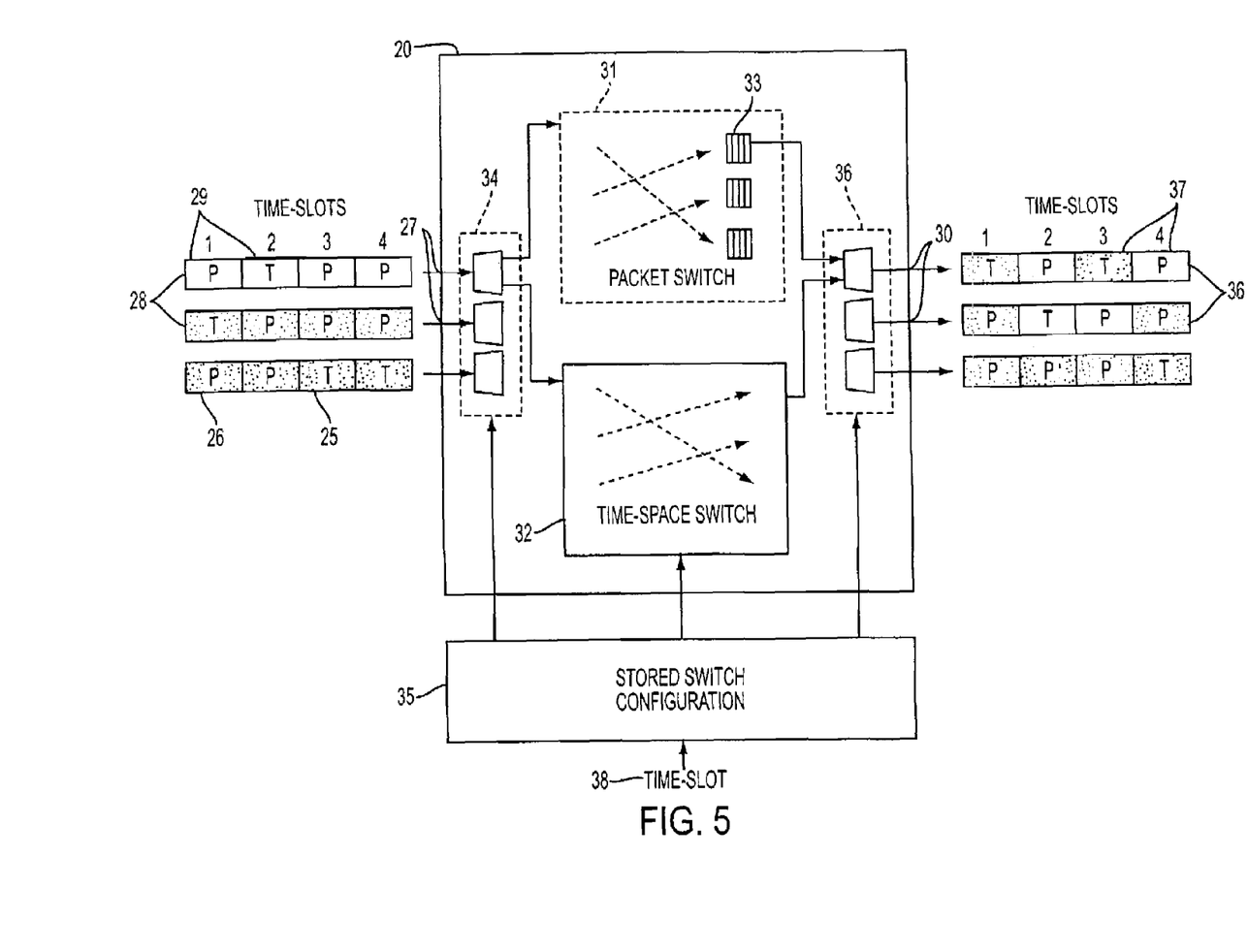
FIG. 5 illustrates a conceptual plan view of a hybrid switch of the invention.

FIG. 5 illustrates a conceptual plan view of a hybrid switch of the invention. The hybrid switch 20 receives both TDM data 25, indicated by "T," and packet data 26, indicated by "P". Incoming data at each input port 27 of the switch 20 is organized into frames 28, which are repetitive, fixed length sequences of time slots 29. For each frame, the switch 20 passes data from input ports 27 to specific output ports 30 as determined by the stored switch configuration 35. Although only one frame of data is shown for each input and for each output of the switch 20, the assignment of time slots 29 to TDM data and packet data is the same for all frames.

The hybrid switch 20 conceptually contains both a packet switch 31 and a time-space switch 32. At the input of the switch 20, a data router 34 routes data from the input ports 27 to either the packet switch 31 or the TDM switch 32 on a logical port basis. The assignment is determined by a stored switch configuration 35 for the switch 20. At the output of the switch 20, a data router 36 routes data from the TDM and packet switches 31, 32 to the appropriate output ports 30. Like data at the input ports 27, data at the output ports 30 is organized into frames 36 and times slots 37. The TDM switching is accomplished by the time-space switch 32, and the packet switching is accomplished by the packet switch 31, which uses internal queues 33. It should be noted that the separation in FIG. 5 of the TDM and packet switches 31, 32 are conceptual, and in practicing the invention, the TDM and packet switches 31, 32 are combined.

The relationship between the input ports 27 and the output ports 30 is determined by the stored switch configuration 35. The stored switch configuration 35 is updated each time a TDM or packet connection is established or terminated. For TDM switching, the stored switch configuration 35 determines where to route the data by examining the input time slot 38. For packet switching, the stored switch configuration 35 determines where to route the packet by examining both the input logical port of the packet and the routing information carried in the packet.

The hybrid switch 20 of the invention differs from the prior art hybrid schemes of FIG. 3 in which TDM channels are passed through a packet switch by encapsulating blocks of TDM data in packets. The encapsulation and de-encapsulation processes required by these prior art schemes are complex in that routing information must be added to the TDM data before it is passed to the packet switch 13. Then, at the egress of the packet switch, the TDM data must be extracted from the packet. Furthermore, TDM packets must compete with each other and with other packets in traversing the packet switch. Therefore, it is difficult to specify a fixed latency for the transfer of each packet, and an elastic store at the switch egress is required to compensate for the latency variation. With the prior art scheme, for example, undesirable disruptions to TDM switched telephone conversations may be experienced due to nonuniform delays encountered by TDM data passing through such a switch.

In contrast, using the hybrid switch of the invention, routing information does not need to be added to the TDM data before the TDM data is passed to the switch 20. The hybrid switching of the invention is unique in that the TDM data does not need to be encapsulated in packets in order to be passed through the switch 20. This yields several distinct advantages. First, the TDM data transfers are isochronous with the input and output clocks. Therefore, no elastic store is required for the removal of latency variations at the switch egress. Second, the bandwidth required by the switch for the switching of each TDM logical port is automatically reserved, and cannot be preempted by other traffic. Therefore, the performance is identical to that of a standard time-space TDM switch. Third, no excess switch bandwidth is consumed by routing overhead for the TDM data. The TDM connection information is maintained by the stored switch configuration 35 and is not combined with the TDM data before it is applied to the input of the switch 20.

The hybrid switch 20 can be implemented using any type of packet switch architecture that is superimposed upon the time-space switch used for TDM data. Preferably, the switch 20 is implemented using a shared memory packet switch that can store both TDM data and packet data. Shared memory packet switching that switches only packet data, and does not switch TDM data, is discussed in Tarek N. Saadawi, Mostafa H. Ammar, and Ahmed El Hakeem, "Fundamentals of Telecommunication Networks," John Wiley & Sons, 1994.

In a shared memory packet switch, a large common block of random access memory (RAM) is used to store all packets awaiting transmission. Individual queues of packets, each associated with a single output logical port, are maintained in the shared memory. The queues are established and maintained by a packet switch control function. For each time slot, each input provides one packet at most to the switch, and each output obtains one packet at most from the switch. From the point of view of the shared memory, the switching of either packets or TDM time slots involves no space dimension, since the shared memory has only one input port and only one output port. The switching process involves the time dimension only, and is termed a time slot interchange (TSI).

Typically, packets are presented to and extracted from the shared memory in parallel. Data from each input port must be accumulated until an amount corresponding to the word width of the memory is available. Similarly, a word width of parallel data must be decomposed and forwarded out each output in sequence.

Figure 6:
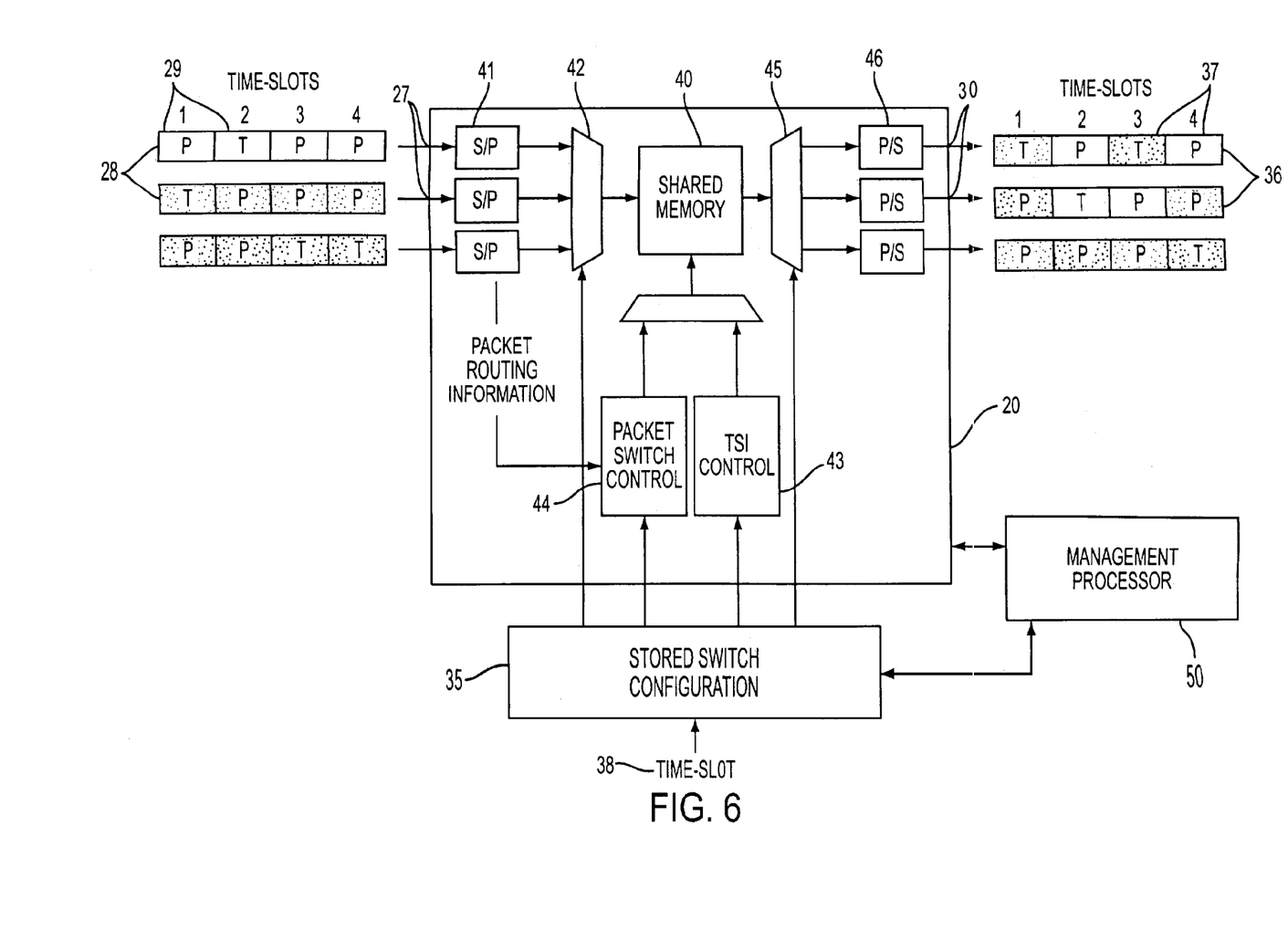
FIG. 6 illustrates a plan view of a hybrid switch using shared memory.

FIG. 6 illustrates a plan view of a hybrid switch using shared memory. When used to implement the hybrid switch 20, the shared memory 40 implements a TSI function and a packet-switch function simultaneously. As in FIG. 5, the input and output port data is arranged in frames 28, 36 with time slots 29, 37. Each input data stream is applied to a serial-to-parallel (S/P) converter 41. A data router 42 routes the output from the serial-to-parallel converters 41 in a multiplexed manner for input to the shared memory 40. The data router 42 selects one output from the serial-to-parallel converters 41 for each memory write cycle. The write address for the shared memory 40 is produced by either a TSI control function 43 or a packet switch control function 44. The shared memory 40 routes the incoming data from the input ports 27 to the appropriate output ports 30. The output of the shared memory 40 is passed to the data router 45. The data router 45 routes the output from the shared memory 40 to parallel-to-serial (P/S) converters 46 in a demultiplexed manner. The parallel-to-serial converters 46 output the TDM data and packet data as frames 36 with time slots 37.

Figure 7:
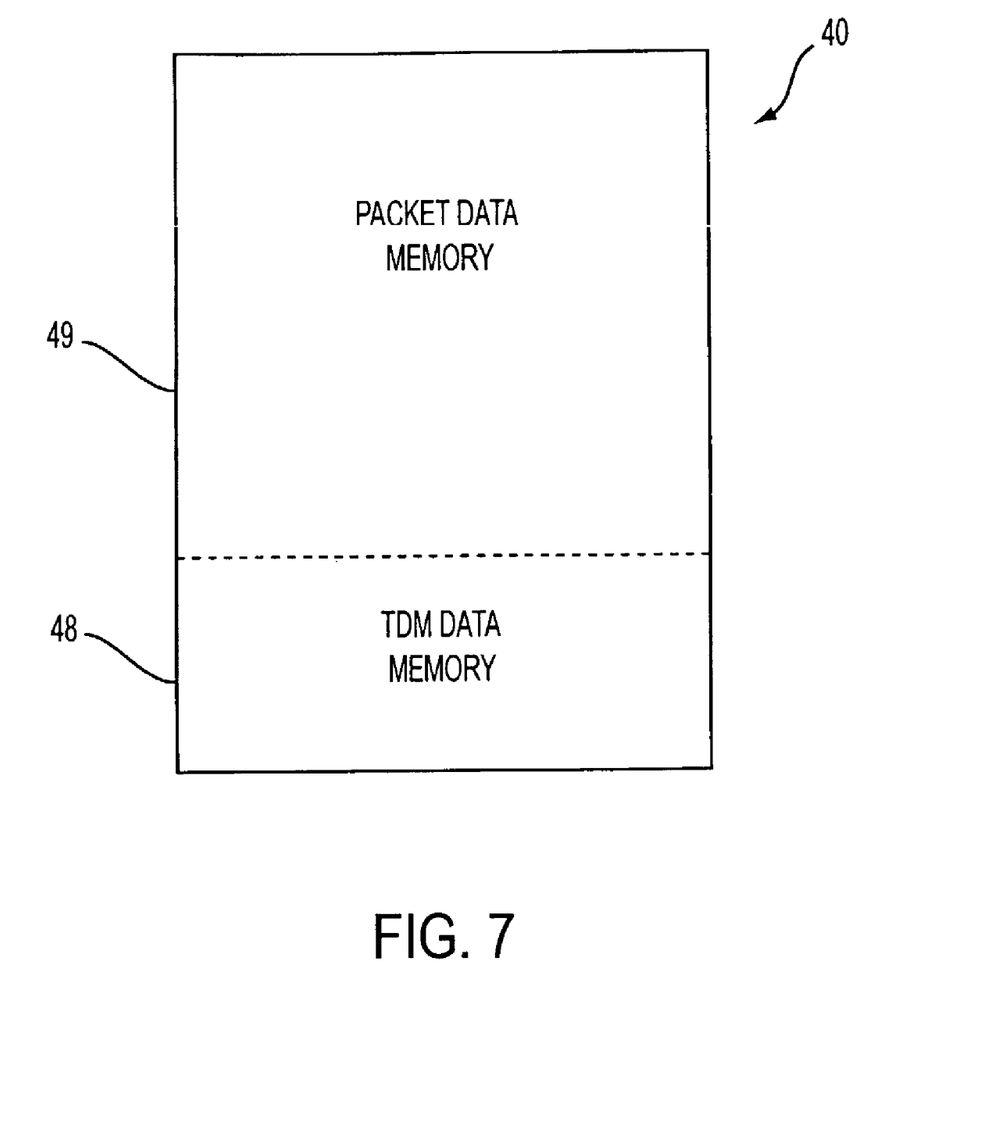
FIG. 7 illustrates a plan view of the shared memory of the hybrid switch of FIG. 6.

FIG. 7 illustrates a plan view of the shared memory 40 of the hybrid switch 20 of FIG. 6. The shared memory 40 is a random access memory (RAM) and is divided into two sections, a TDM data memory 48 and a packet data memory 49. The TDM data memory 48 is reserved solely for TDM data, and the packet data memory 49 is reserved solely for packet data. Enough of the shared memory 40 is set aside as the TDM data memory 48 to accommodate the scenario when each time slot 29 of each input frame 28 of each input port 27 has TDM data. In initially partitioning the shared memory 40, after the portion of shared memory 40 is reserved for the TDM data memory 48, the remaining shared memory 40 is reserved for the packet data memory 49. As an example using FIG. 6, if the switch had four input ports 27 and if each frame 28 had four time slots 29, the TDM data memory 48 would be reserved to accommodate sixteen TDM data time slot units.

For each memory input cycle of the shared memory 40, if the input time slot belongs to a TDM logical port, the address of the shared memory 40 is selected from the TSI control function 43. If the input time slot belongs to a packet logical port, the address of the shared memory 40 is selected from the packet switch control function 44. The TSI control function 43 always generates the same memory address during the cycle corresponding to a particular time slot of a frame. Data belonging to a particular TDM logical port is written to a stationary buffer of the TDM data memory 48. The packet switch control function 44 generates the address in the packet data memory 49 based on routing data embedded in the packet and based on the logical input port to which the time slot belongs. The address generated by the packet switch control function 44 represents the "tail" of the queue corresponding to a specific output logical port.

For each memory output cycle of the shared memory 40, the address of shared memory 40 is selected in a similar manner as for the memory input cycle. For TDM time slots, the read address of the TDM data memory 48 is provided by the TSI control function 43, which generates the address using the stored switch configuration 35. The address generated corresponds to one of the stationary buffers in the TDM data memory 48. The buffer selection defines the logical port-to-logical port connectivity for TDM connections. The stationary buffer is a static size, and can be as small as one time slot worth of TDM data. For packet time slots, the address of the packet data memory 49 is selected from the packet switch control function 44. The address in the packet data memory 49 generated by the packet switch control function 44 points to the "head" of the queue for the specific output logical port.

The TSI control function 43, the packet switch control function 44, and the stored switch configuration 35 can be implemented using digital logic hardware, software executing on one or more microprocessors or microcontrollers, or a combination of these approaches.

The hybrid switch 20 connects to each of one or more I/O channel cards 22 using two point-to-point interconnections. These point-to-point interconnections are used to transport TDM data and packet data between the hybrid switch 20 and the I/O channel cards 22. One of these interconnections conveys input TDM data and packet data to the hybrid switch 20 from the I/O channel card 22, and the other conveys output TDM data and packet data from the hybrid switch 20 to the I/O channel card 22. These point-to-point connections are called port module interfaces and are designated in FIG. 4 with reference numeral 23.

The port module interfaces convey both TDM data and packet data between the hybrid switch 20 and the I/O channel cards utilizing a synchronous, time-slotted frame format. The port module interface is itself a TDM transport mechanism, but this is not the same as the TDM switched data discussed previously. One time slot within the port module interface frame is called a data exchange unit (DEU). A DEU containing TDM switched data is called a TDM DEU, and a DEU containing packet switched data is called a packet DEU.

TDM and packet DEUs are handled by the hybrid switch 20 in a similar manner. Both are received, buffered in the shared memory 40, and subsequently transmitted when scheduled. There are, however, key differences between the formats of TDM and packet DEUs, due to the way they are treated in the hybrid switch 20. Because TDM switching is defined in the stored switch configuration 35 entirely by the time slot in which the DEU resides on the port module interface, no special headers or routing information is needed in the TDM DEU itself. The entire TDM DEU can therefore be composed of the TDM data being switched.

Packet DEUs can enter the hybrid switch 20 at any time, and can be destined for any output port 30. Therefore, packet DEUs include a header containing routing information. The hybrid switch 20 examines the routing information in the header of a packet DEU and uses it, along with the input logical port and the stored switch configuration 35, to determine the output logical port queue into which to place the packet DEU.

The packet DEU concept is not limited to protocols whose packets fit entirely within a single DEU. When using a packet switched protocol that allows for packet lengths which exceed the capacity of a single packet DEU, the packet DEU header can be expanded with additional information needed to support packet fragmentation and reassembly. Such information includes but is not limited to internal ID numbers, fragment sequence numbers, and fragment size information. The architecture of the hybrid switch 20 allows the format of the packet DEU to be redefined based on the needs of the protocols being served by a particular I/O channel card 22.

Within the port module interface, there is complete flexibility for any of the DEU time slots to be defined as carrying either TDM DEUs or packet DEUs. When a DEU time slot is defined as carrying TDM DEUs, it will always be TDM switched in accordance with the stored switch configuration 35. When a DEU time slot is defined as carrying packet DEUs, it will be examined at the hybrid switch 20 input to determine if it contains a packet DEU or a third type of DEU, called a "null" DEU. A null DEU caries no data, but serves as a placeholder in the port module interface frame. If the time slot is found to contain a packet DEU, the DEU will be enqueued in the manner previously described. If the DEU is found to contain a null DEU, the DEU will be discarded.

Overall, the system of FIG. 4 operates in a synchronous, time/space division multiplexed manner. The switch 20 and the I/O channel cards 22 exchange DEUs in a space division multiplexed manner over the point-to-point connections between the switch 20 and the I/O channel cards 22. Internal to the switch 20, DEUs are switched in a time division multiplexed manner.

The hybrid switch of the invention can be used with various types of TDM data and packet data. The TDM data, for example, can be any of the following TDM data types: synchronous optical network (SONET), synchronous digital hierarchy (SDH), T3, T1, E3, and E1. The packet data, for example, can be any of the following packet data types: asynchronous transfer mode (ATM), Internet protocol (IP), frame relay, and X25. These two exemplary lists, as well as the other examples discussed herein, are non-limiting examples. For instance, there are currently other TDM data types available, and numerous other packet data types available. These other current TDM and packet data types can be used with the invention, and other TDM and packet data types to be developed to accommodate communication needs can likewise be used with the invention.

EXAMPLE

An exemplary implementation of the hybrid switch of the invention is described using the synchronous optical network (SONET) synchronous payload envelope (SPE) data format for TDM data and the asynchronous transfer mode (ATM) cell format for packet data. In this example, the "packets" are actually ATM cells, and the term "ATM DEU" is used in the place of "packet DEU."

Figure 8:
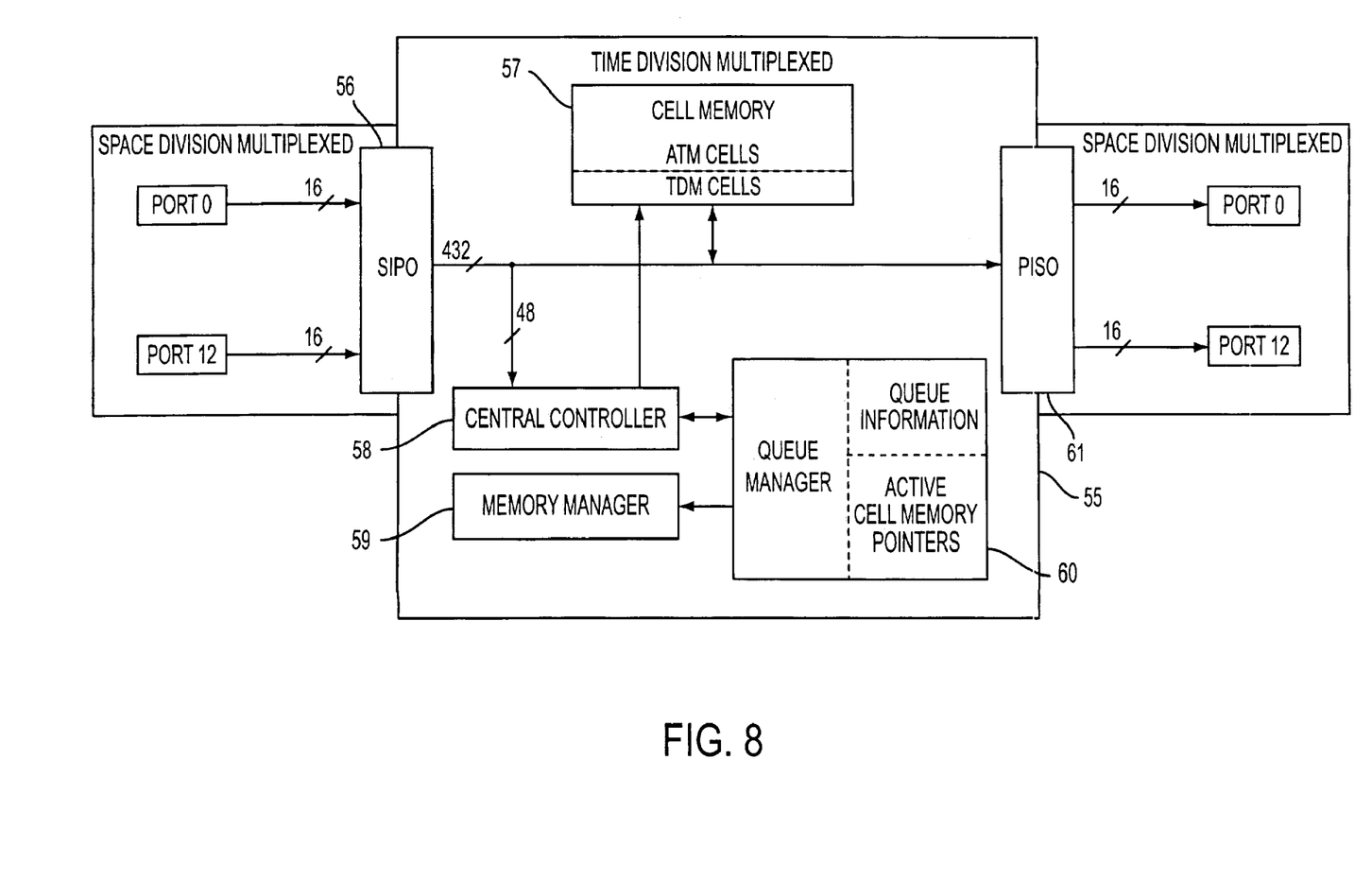
FIG. 8 illustrates a plan view of the exemplary implementation.

FIG. 8 illustrates a plan view of the exemplary implementation. The hybrid switch 55 has six major areas of functionality: the SIPO 56, the cell memory 57, the central controller 58, the memory manager 59, the queue manager 60, and the PISO 61.

The SIPO 56 performs serial-to-parallel conversion of the received DEUs. This allows each DEU to be written into cell memory 57 in a single clock cycle. The SIPO 56 converts the space division multiplexed port input into a time division multiplexed input into the switch 55.

The PISO 61 performs parallel-to-serial conversion of the transmitted DEUs. The PISO 61 converts the time division outputs from the switch 55 into space division multiplexed outputs to the output ports.

The cell memory 57 provides storage for both TDM and ATM data traffic in a fully parallel format. All bytes of a given DEU are stored at the same address in cell memory 57. A portion of the cell memory 57 is partitioned for use by TDM data, and the remainder of the cell memory 57 is partitioned for use by ATM data. The memory manager 59 monitors the usage of the cell memory.

The queue manager 60 places the received ATM DEUs into the appropriate queue(s) and dequeues ATM DEUs for transmission. The queue manager 60 also performs congestion management functions.

The central controller 58 coordinates the operation of all the other blocks. The central controller controls the storage of TDM DEUs in cell memory 57 based on the port module bus time slot in which the TDM DEU was received, and also schedules the transmission of TDM DEUs based on the port module bus time slot in which a TDM DEU is to be transmitted. In other words, the central controller 58 expects to receive and subsequently transmit TDM DEUs in fixed, predetermined port module bus time slots. The remaining port module bus time slots are used to receive and transmit ATM DEUs. ATM DEUs are sent from the I/O channel cards to the hybrid switch in any port module bus time slot not assigned to TDM traffic, but they are sent from the switch to the I/O channel cards only in the assigned time slot. This ensures that each logical port is serviced at the correct rate and allows the I/O channel card to associate DEUs to be transmitted with the correct logical port, and thus the correct physical port.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A switch to switch time division multiplexed (TDM) data and packet data from input ports to output ports, comprising:
   a plurality of input ports to receive data, wherein each data comprises either TDM data or packet data;
   a plurality of output ports to transmit switched data;
   a single shared memory coupling said input ports to said output ports, said single shared memory to receive sequentially all TDM data and all packet data received from said input ports, said single shared memory to store both TDM data and packet data, said single shared memory to switch all sequentially received TDM data and packet data received from respective input ports to respective output ports, and wherein switching of any received TDM data is based on input time slots of said TDM data;
   a time slot interchange controller coupled to said single shared memory to select addresses in said single shared memory to store TDM data, said time slot interchange controller to select an address of said single shared memory for a TDM data based on a time slot of a frame in which said switch received the TDM data, wherein said time slot interchange controller selects a same address for said single shared memory each time TDM data is received in a respective time slot of a respective frame; and
   a packet switch controller coupled to said single shared memory to select addresses in said single shared memory to store packet data, said packet switch controller to select an address of said single shared memory for a packet data based on routing data embedded in the packet data and based on the input port which received the packet data.

2. A switch as claimed in claim 1, wherein each data is received by an input port as a time slot in a frame.

3. A switch as claimed in claim 1, wherein said single shared memory comprises a TDM data memory portion and a packet data memory portion.

4. A switch as claimed in claim 1, wherein said single shared memory treats the input ports as logical input ports.

5. A switch as claimed in claim 1, wherein said single shared memory to place sequentially received packet data in a queue for a respective output port.

6. A switch as claimed in claim 1, wherein the data are received by said input ports and transmitted by said output ports as data exchange units.

7. A switch as claimed in claim 1, wherein the switching of a data from a respective input port to a respective output port is controlled by a stored switch configuration.

8. A switch as claimed in claim 1, further comprising:
   an input data router to route sequentially data from said input ports to said single shared memory; and
   an output data router to route sequentially data from said single shared memory to said output ports.

9. A switch as claimed in claim 1, wherein the data are received by said input ports and transmitted by said output ports as data exchange units, the data exchange units for packet data comprise routing information, the switching of a data exchange unit from a respective input port to a respective output port is controlled by a stored switch configuration, said stored switch configuration uses the routing information of data exchange units for packet data to determine respective output ports to switch the data exchange units.

10. A switch for switching time division multiplexed (TDM) data and packet data from input ports to output ports, comprising:
   a plurality of input ports to receive data, wherein each data comprises either TDM data or packet data;
   a plurality of output ports to transmit switched data;
   a shared memory coupling said input ports to said output ports, said shared memory to receive sequentially the data received from said input ports, said shared memory to switch a sequentially received data from a respective input port to a respective output port;

a time slot interchange controller coupled to said shared memory to select addresses in said shared memory to store TDM data, said time slot interchange controller to select an address of said shared memory for a TDM data based on a time slot of a frame in which said switch received the TDM data, wherein said time slot interchange controller selects a same address for said shared memory each time TDM data is received in a respective time slot of a respective frame; and a packet switch controller coupled to said shared memory to select addresses in said shared memory to store packet data, said packet switch controller to select an address of shared memory for a packet data based on routing data embedded in the packet data and based on the input port which received the packet data.

11. A switch as claimed in claim 10, wherein each data is received by an input port as a time slot in a frame.

12. A switch as claimed in claim 10, wherein said shared memory treats the input ports as logical input ports.

13. A switch as claimed in claim 10, wherein said shared memory places sequentially received packet data in a queue for a respective output port.

14. A switch as claimed in claim 10, wherein the data are received by said input ports and transmitted by said output ports as data exchange units.

15. A switch to switch time division multiplexed (TDM) data and packet data from input ports to output ports, comprising:

a plurality of input ports to receive TDM data and packet data, each TDM data having an associated time slot of a frame;

a plurality of output ports to transmit switched data;

a single shared memory to switch TDM data and packet data from said input ports to said output ports, said single shared memory to store TDM data received at said input ports based on said time slot of said frame of each TDM data, said single shared memory to store packet data received at said input ports based on routing data embedded in each packet data and based on which input port received each packet data;

a time slot interchange controller external to and coupled to said single shared memory to direct said single shared memory regarding storage of TDM data, wherein said time slot interchange controller selects a same address for said single shared memory corresponding to a respective time slot of a respective frame when TDM data is received in said respective time slot of said respective frame; and a packet switch controller external to and coupled to said single shared memory to direct said single shared memory regarding storage of packet data.

16. A switch as claimed in claim 15, wherein said single shared memory to treat the input ports as logical input ports.

17. A switch as claimed in claim 15, wherein said single shared memory to place sequentially received packet data in a queue for a respective output port.

18. A switch as claimed in claim 15, wherein said input ports to receive and said output ports to transmit TDM data and packet data as data exchange units.

19. A switch as claimed in claim 18, wherein the data exchange units for packet data comprise routing information used to determine output ports to switch the data exchange units.

20. A switch as claimed in claim 15, further comprising:

an input data router to route TDM data and packet data sequentially from said input ports to said single shared memory; and an output data router to route TDM data and packet data sequentially from said single shared memory to said output ports.

21. A system to switch time division multiplexed (TDM) data and packet data from input ports to output ports, comprising:

said switch of claim 15; and a stored switch configuration coupled to said switch to control switching of said TDM data and packet data from said input ports to said output ports.

22. A method to switch time division multiplexed (TDM) data and packet data, comprising:

receiving TDM data and packet data at N input ports;

storing received TDM data in a single shared memory based on a time slot of a frame of each TDM data, wherein each frame has M time slots;

storing received packet data in said single shared memory based on routing data embedded in each packet data and based on which input port received each packet data; and forwarding stored TDM data and packet data from said single shared memory to said output ports, wherein said single shared memory comprises a TDM data memory portion and a packet data memory portion, and wherein said TDM memory portion accommodates N×M TDM data.

23. The method of claim 22, wherein TDM data are stored in a preselected area of said single shared memory based on said time slots of said frames.

24. The method of claim 23, wherein packet data are stored in an area other than said preselected area of said single shared memory.

25. The method of claim 23, wherein said preselected area of said single shared memory to store TDM data is sectioned according to time slots and frames.

26. The method of claim 22, wherein the output ports for TDM data are determined based on said time slots of said frames, and wherein the output ports for packet data are determined based on said embedded routing data and based the input ports which received the packet data.

27. A switch for switching time division multiplexed (TDM) data and packet data from input ports to output ports, comprising:

a plurality of input ports to receive data, wherein each data comprises either TDM data or packet data;

a plurality of output ports to transmit switched data;

a shared memory coupling said input ports to said output ports, said shared memory to receive sequentially the data received from said input ports, said shared memory to switch a sequentially received data from a respective input port to a respective output port, wherein said shared memory comprises a TDM data memory portion and a packet data memory portion and wherein each section of the TDM data memory portion is assigned to a respective time slot of a respective frame;

a time slot interchange controller coupled to said shared memory to select addresses in said shared memory to store TDM data, said time slot interchange controller to select an address of said shared memory for a TDM data based on a time slot of a frame in which said switch received the TDM data; and a packet switch controller coupled to said shared memory to select addresses in said shared memory to store packet data, said packet switch controller to select an address of shared memory for a packet data based on routing data embedded in the packet data and based on the input port which received the packet data.

28. A switch to switch time division multiplexed (TDM) data and packet data from input ports to output ports, comprising:
- a plurality of input ports to receive TDM data and packet data, each TDM data having an associated time slot of a frame;
- a plurality of output ports to transmit switched data;
- a single shared memory to switch TDM data and packet data from said input ports to said output ports, said single shared memory to store TDM data received at said input ports based on said time slot of said frame of each TDM data, said single shared memory to store packet data received at said input ports based on routing data embedded in each packet data and based on which input port received each packet data, wherein said single shared memory comprises a TDM data memory portion and a packet data memory portion and wherein each address of the TDM memory portion is assigned to a respective time slot of a respective frame.

29. A switch to switch time division multiplexed (TDM) data and packet data from input ports to output ports, comprising:
- a plurality of input ports to receive TDM data and packet data, each TDM data having an associated time slot of a frame;
- a plurality of output ports to transmit switched data;
- a single shared memory to switch TDM data and packet data from said input ports to said output ports, said single shared memory to store TDM data received at said input ports based on said time slot of said frame of each TDM data, said single shared memory to store packet data received at said input ports based on routing data embedded in each packet data and based on which input port received each packet data, wherein said single shared memory comprises a TDM data memory portion and a packet data memory portion and wherein said TDM memory portion accommodates N×M TDM data, wherein said switch has N input ports, wherein each frame has M time slots.

* * * * *

UNITED STATES PATENT AND TRADEMARK OFFICE
CERTIFICATE OF CORRECTION

PATENT NO. : 6,931,002 B1
DATED : August 16, 2005
INVENTOR(S) : Daniel S. Simpkins et al.

It is certified that error appears in the above-identified patent and that said Letters Patent is hereby corrected as shown below:

<u>Title page,</u>
Item [57], ABSTRACT,
Line 2, "swich" should be -- switch --.

<u>Column 2,</u>
Lines 22-23, there should be no new paragraph.
Line 29, after "one", insert -- of --.

<u>Column 3,</u>
Line 5, delete "contained" and insert -- contain --.

<u>Column 5,</u>
Line 30, delete "are" and insert -- is --.

<u>Column 6,</u>
Line 44, delete "is" and insert -- are --.

<u>Column 12,</u>
Line 44, after "based", insert -- on --.

Signed and Sealed this

Tenth Day of January, 2006

JON W. DUDAS
*Director of the United States Patent and Trademark Office*